Dec. 23, 1941.     W. E. SCHOBER     2,266,817
BRAKE CONTROL VALVE
Filed Oct. 12, 1940     3 Sheets-Sheet 1
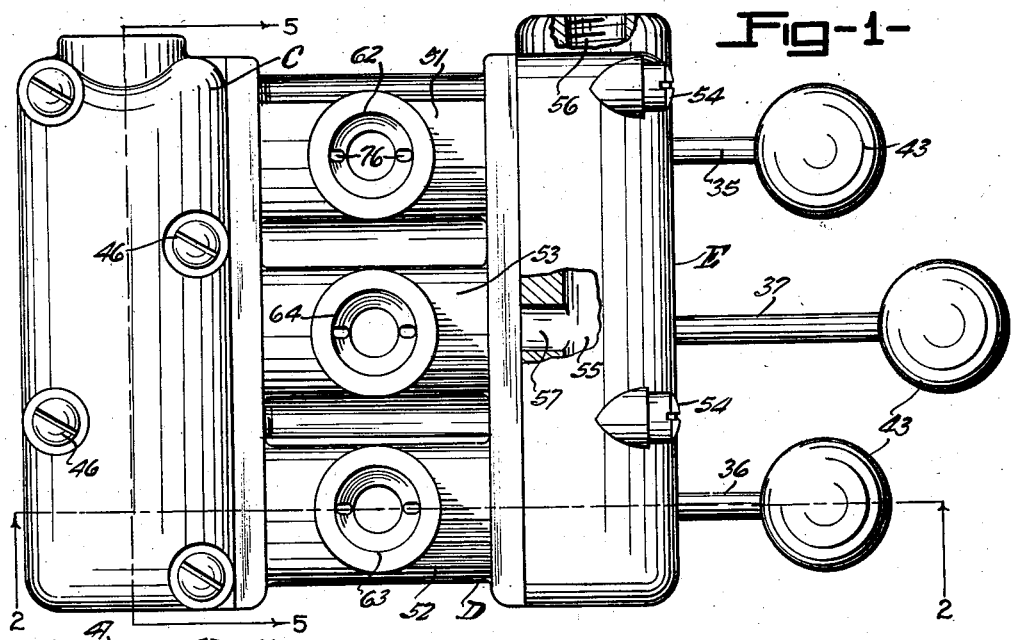
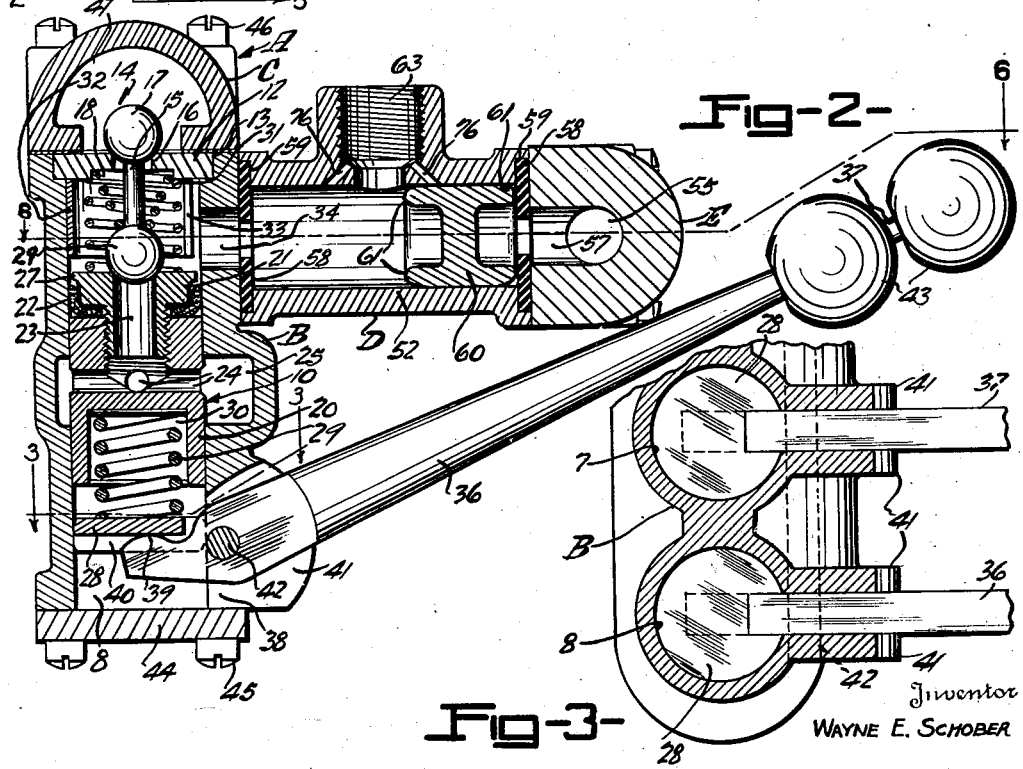
Inventor
WAYNE E. SCHOBER
By Carlsen & Hayle
Attorneys Dec. 23, 1941.                   W. E. SCHOBER                 2,266,817
                              BRAKE CONTROL VALVE
                          Filed Oct. 12, 1940          3 Sheets—Sheet 2
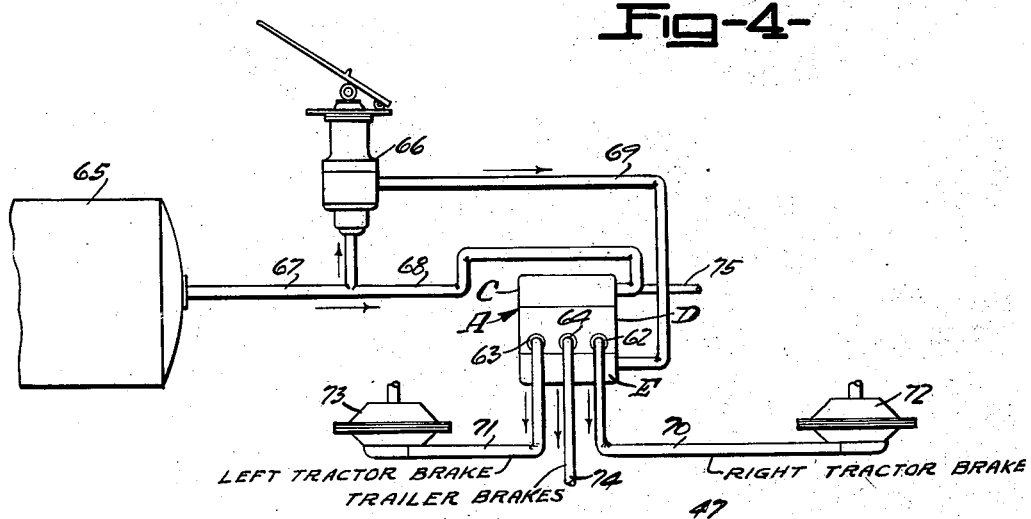
Inventor
WAYNE E. SCHOBER

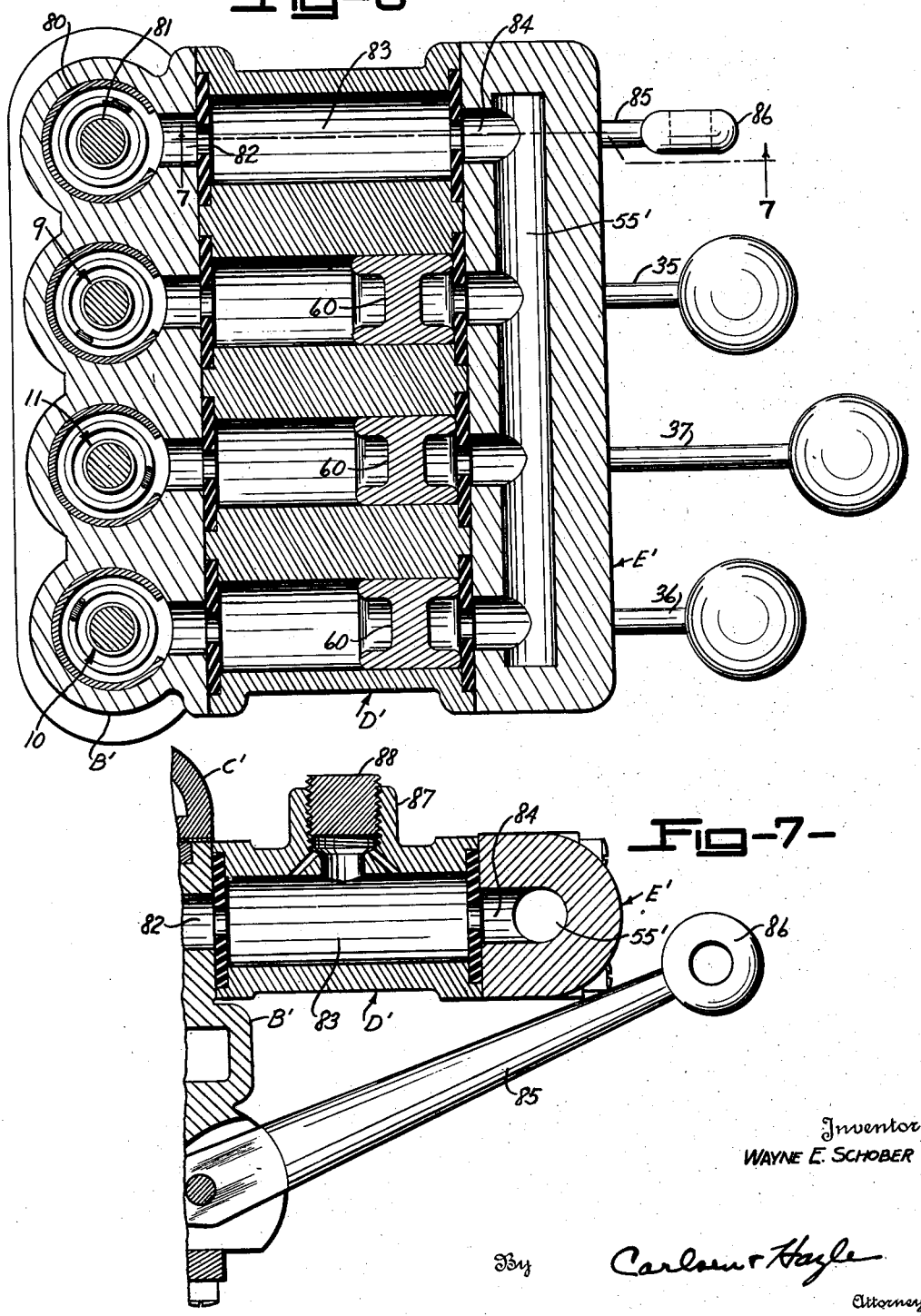

Patented Dec. 23, 1941

2,266,817

UNITED STATES PATENT OFFICE 2,266,817

BRAKE CONTROL VALVE

Wayne E. Schober, Minneapolis, Minn., assignor to Minneapolis-Moline Power Implement Company, Minneapolis, Minn., a corporation of Delaware Application October 12, 1940, Serial No. 360,938

19 Claims. (Cl. 188—3)

This invention relates to improvements in valves for controlling air brakes.

In the usual tractor and trailer combination there is need for a control valve for applying the tractor rear wheel brakes separately to facilitate making a short turn to either side, and a valve for controlling the brakes of the trailer, these valves being used of course in addition to the usual foot pedal operated valve which sets all brakes simultaneously. Heretofore these valves have all been separate units and it is evident that a relatively complicated system of piping and check valve units is necessary to properly connect and operate such an assembly.

The primary object of this invention is to provide in a single compact unit the required valves for individually controlling the tractor wheel brakes and the trailer brakes and to provide in such unit all the necessary check valves. The unit may then be connected into the brake system with a minimum of piping and connections.

Another object is to provide in a control valve mechanism of this kind an improved arrangement of the control levers by which any valve may be individually operated, or all operated simultaneously if so desired.

Another object is to provide a unitary valve assembly in which may be embodied, in addition to the separate valves for controlling the right and left wheel tractor brakes and the trailer brakes, the main valve for setting all brakes simultaneously. The latter valve is provided as operating means with a lever which may be connected to a foot pedal or which may be hand manipulated as may be desired.

Still another object is to provide a valve unit of this kind in which all valves are of the graduating type and thus will hold the brakes in operation at any selected pressure setting until the control handles are operated to release the brakes.

These and other more detailed and specific objects will be disclosed in the course of the following specifications, reference being had to the accompanying drawings, in which—

Fig. 1 is a plan view of the valve structure of my invention.

Fig. 2 is a vertical section along the line 2—2 in Fig. 1.

Fig. 3 is a fragmentary horizontal section along the line 3—3 in Fig. 2.

Fig. 4 is a diagrammatic view of the valve unit and its connections with the brake system.

Fig. 5 is a vertical section along the line 5—5 in Fig. 1.

Fig. 6 is a horizontal section substantially along the line 6—6 in Fig. 2 but showing a modified assembly in which the main brake valve is also incorporated.

Fig. 7 is a fragmentary vertical section taken along the line 7—7 in Fig. 6.

Referring now more particularly and by reference characters to the drawings, the valve unit is seen to comprise a housing designated generally at A and including as its main parts a valve body B, reservoir inlet manifold C, slide or check valve body D, and brake inlet manifold E.

The main valve body B has formed therein three spaced and vertically extending valve chambers or cylinders 6, 7, and 8 (Fig. 5) in which are mounted the right and left tractor wheel brake control valve mechanism 9 and 10 and the trailer brake control valve mechanism 11. Inasmuch as the valves 9, 10, and 11 are identical in construction a description of one will suffice for all. Arranged at the upper end of each chamber is an inlet valve seating disk 12 which rests upon the annular shoulder formed by a diametrical enlargement 13 of the chamber, it being understood and clearly shown that the valve chambers or cylinders extend at their ends through both upper and lower ends of the said valve body B. A dumb-bell, or double ended ball valve 14 has its stem 15 passed downwardly loosely through a central inlet opening 16 in the disk 12 so that the uppermost ball 17 may seat against this opening and thereby seal against the passage of air downwardly into the valve chamber. An expansion coil spring 18 braced against the lower ball 19 yieldably holds the valve in this position.

Arranged beneath each dumb-bell valve 14 is a graduating piston 20 into the upper end of which is recessed an exhaust valve memer 21, the said member retaining a cup washer 22 in place atop the piston to seal around the wall of the valve chamber or cylinder. The member 21 has a bore 23 opening through its upper face and against the upper end of which the lower ball 19 normally seats. The lower end of said bore 23 communicates with the tapped socket receiving the member 21 and in turn with diametrically extending cross bores 24 in the piston. An exhaust recess or chamber 25 is formed in the body B and encircles each chamber 6, 7, and 8 in communication therewith at the level of the bores 24. At one end the recess 25 opens through the body as represented at 26. The member 21 is turned from hexagonal stock having an upper rim portion 27 of this shape as an aid in screwing the member into the piston.

A spring seat or washer 28 is disposed beneath each graduating piston and braced between the washer and piston is a graduating spring 29 of the expansion coil variety which enters a recess 30 in the lower end of the piston. The entire piston is urged downwardly, to the point that it rests on the spring 29, by means of a return spring 31 which is braced between the valve seating disk 12 and the member 21.

A spacing band or yoke 32 is placed within each valve chamber immediately below the disk 12 and is of annular shape but parted so that its ends stand apart on one side (front) as indicated at 33. At this point each chamber 6, 7, and 8 communicates with a port 34 opening through the forward side of the body B.

For each valve mechanism 9, 10, and 11 a separate control lever is provided as represented at 35, 36, and 37 respectively. Lower rear ends of these levers are received in slots 38 entering the chambers 6, 7, and 8 at lower forward sides and the rounded or bossed inner or operating ends 39 of the levers are fitted in slots 40 cut in undersides of the spring seats or washers 28. Pivot ears 41 are formed alongside each slot 38 and a pivot pin 42 is passed through these ears and the levers 35, 36, and 37 to thereby pivotally mount the levers for up and down swinging movements in the plane of the valve chambers in valve body B. The spring seats 28 rest upon the bossed inner ends 39 of the levers and the levers normally extend forwardly and angularly upward as shown so that, by a downward movement, their inner ends will be urged upwardly to move the spring seats upwardly in the valve chambers. Knobs 43 are provided on outer ends of the control levers and the center lever 37 controlling the trailer brake valve, is made substantially longer than the others to facilitate its operation independently thereof.

A bottom cover plate 44 is secured by screws 45 to the lower end of the valve body B after the parts are assembled within the chambers 6, 7 and 8.

The reservoir inlet manifold C is secured by screws 46 atop the valve body B and has an elongated recess 47 communicating by openings 48 through its lower face with the chambers 6, 7, and 8 under control of the valves 14 which extend upwardly through said openings. A gasket 49 is placed between manifold and valve body and at one end the recess 47 has the tapped opening 50.

The slide or check valve body D is arranged over the upper forward face of main valve body B and extends forwardly therefrom. Valve cylinders 51, 52, and 53, three in number, are bored through the body D to open through front and rear ends thereof and these cylinders are so spaced that their axes will lie in the same plane as, but at right angles to, the axes of the main valve chambers 6, 7, and 8. Furthermore the cylinders 51, 52, and 53 are located in endwise communication with the respective ports 34 opening forwardly from said chambers.

The brake inlet manifold E is mounted over the forward end of the body D and is secured thereto by elongated screws 54 which extend rearwardly alongside the body D and are screwed into valve body B. These screws thus serve to secure all of the valve body parts together as will be readily understood. An inlet bore 55 is formed along the length of the manifold E and at one end opens through the end of the manifold and is tapped for connection of piping as indicated at 56. Also communicating with the bore 55 are three ports 57 which are axially aligned with and open into the valve cylinders 51, 52, and 53. Rubber or resilient seat washers 58 are retained in place at the ends of the body D over the ports 34 and 57, the ends of the body around the cylinders being diametrically enlarged at 59 to receive said washers.

A check valve or slide valve plunger or member 60 is slidably mounted in each cylinder 51, 52, and 53 and has rounded ends 61 which may engage and seat against either seat washer 58 as the valve member moves from end to end of the cylinders. Each of said cylinders communicates at a medial point with upwardly opening tapped outlets or openings 62, 63, and 64 which thus, through the various valve operations to be described, are connected respectively with the right and left hand tractor brake valve mechanisms 9 and 10 and the trailer brake control valve mechanism 11.

Referring to Fig. 4 the connection of the valve unit in the brake system will now be described. A reservoir 65 contains air under pressure for operating the brakes and the usual foot pedal controlled main valve device 66 is provided and connected by a line 67 to the reservoir. Also connected to the reservoir is a line 68 which is connected to the reservoir inlet manifold C by coupling into the end 50 thereof. The line 69 to which the valve 66 admits pressure when operated is connected to the end 56 of the brake inlet manifold E. Lines 70 and 71 then connect the outlets 62 and 63 to the right and left hand tractor wheel brake cylinders 72 and 73, respectively, and a line 74 is led rearwardly from the outlet 64 to the trailer wheel brakes (not shown). An exhaust pipe (see Fig. 4) may be screwed into opening 26 as represented at 75.

In the ordinary operation of the brakes by the foot pedal valve 66 the valve admits air to the line 69 and it flows through the bore 55 of the manifold E and through ports 57 into all of the cylinders 51, 52, and 53.

The valve members 60 are of course moved rearwardly by this air pressure so that they seal the ports 34 and the air then flows through the outlets 62, 63, and 64 to all of the brakes equally.

When it is desired, however, to apply for example the left hand tractor wheel brake alone the control lever 36 is depressed a short distance and the following actions now take place. The upward movement of the spring seat 28 by this lever action is transmitted through spring 29 to the graduating piston 20 and the piston thus urges the double ball valve 14 upwardly so that the upper ball 17 snaps from its seat in opening 16. The air pressure from the reservoir 65 present in the recess 47 of the inlet manifold C now flows through the opening 16 and out through port 34 into the slide valve cylinder 52 where it moves the valve member 60 forward into sealing engagement over the port 57 and the air may then flow through outlet 63 and line 71 to the brake operating cylinder 73 applying the left wheel brake.

As the air flows through opening 16 and port 34 it also exerts a pressure upon the upper face (constituted by exhaust valve member 21) of the piston 20 and as this pressure builds up it will finally urge the piston downwardly against the tension of spring 29 until the valve ball 17 will again close the opening 16 and retain the selected air pressure in the brake line and cylinder. The tension of the graduating spring 29, and the amount to which it is compressed by the lever 36, will determine the pressure at which this automatic shut off occurs and it is evident that by urging the lever downward to any desired extent a selected or graduated pressure will be brought to bear on the brake operating mechanism and held until the lever is either returned to normal or moved further to a higher pressure setting. When the spring 29 is finally compressed until the spring seat 28 contacts the lower end of the piston 20 the full reservoir pressure will be applied to the brake as will be evident.

To release the brake the lever is allowed to swing back up to normal position whereupon the downward air pressure on the piston will cause the lower ball valve 19 to clear its seat in bore 23 and the air may then flow through this bore and cross bores 24 and out through the exhaust recess 25 and pipe 75.

The same action of course occurs as any lever 35, 36, or 37 is operated and the corresponding brakes set and furthermore it will be evident that all of the brakes may be applied simultaneously by operating all of the levers together at one time.

The springs 31 aid in returning the parts to normal positions while the spacing members 32 limit the upward movement of the graduating piston so that the spring 18 or valve 14 will not be injured by too abrupt or extended movement of the control levers.

There is a possibility that the slide valve members 60 might possibly come to rest in a more or less central position sealing the outlets 62, 63, or 64 so that the brake pressure could not be relieved. To prevent this I provide the small ports 76 which lead forwardly and rearwardly from the tapped outlet openings into the valve cylinders. In any case one of these ports would be open allowing the air pressure to escape from the brakes over one end or the other of the valve member.

It is evident that by my unitary assembly of the control valves and check valves I materially simplify the brake system and provide convenient, graduated control of right and left tractor wheel brakes and trailer brakes.

The main brake valve may be incorporated in my unit as a part thereof as clearly shown in Figs. 6 and 7. Here the valve body B' reservoir inlet manifold C', check valve body D' and brake inlet manifold E' are similar to the aforesaid corresponding parts B, C, D and E and contain the same graduating valves 9, 10 and 11 and check valves 60 in three positions. However, the body parts are extended to provide an additional valve chamber 80 in which another graduating valve may be installed as designated generally at 81, this valve being identical with the other previously described. The chamber 80 communicates through port 82 with an additional check valve cylinder 83 formed in the body D' and which further communicates through a port 84 with the bore 55' of the manifold E'.

The operating lever 85 for the valve 81 is similar in essential respects to the aforesaid levers 35, 36 and 37 but at its outer end may have an apertured eye 86 by which suitable linkage (not shown) may connect it to the usual foot pedal. Or the lever may be hand operated of course.

No check valve is used in the cylinder 83 and when the valve 81 is opened, therefore, by the lever 85 the air will flow from the reservoir inlet manifold through the valve and directly out through the cylinder 83 and into the bore 55' in the brake inlet manifold E'. The air will then move all of the check valve members 60 toward their corresponding graduating valves and the air will flow through the lines 70, 71 and 74 to all of the brakes exactly as has been described. The same graduating and exhausting action is also had. Obviously the bore 55' may now be closed at each end since the connecting line 69 is not required in this assembly.

The same outlet may be provided for the cylinder 83, as has been previously shown at 62, 63 and 64, as represented at 87 and normally it may be closed as by a plug 88. Where separate front wheel brakes are employed this outlet will serve as a convenient connection therefor. Furthermore, the provision of this outlet 87, and boring of the cylinder 83 permits the setting up of the valves in any desired arrangement. For example the main brake valve may be arranged at either end or at an intermediate position simply by properly connecting the lines 70, 71 and 74 and properly locating the members 60 in the check valve cylinders.

It is evident further more that an assembly of only one graduating valve, check valve and operating lever would be useful in some installations and this modification is considered to be within the scope of my invention.

It is understood that suitable modifications made be made in the structure as disclosed, provided such modifications come within the spirit and scope of the appended claims. Having now therefore fully illustrated and described my invention, what I claim to be new and desire to protect by Letters Patent is:

1. A valve unit for controlling right and left hand tractor wheel brakes and the trailer brakes, comprising a housing, three valves operatively arranged in the housing, means for supplying fluid under pressure to the valves, means connecting the valves to the brakes, and control levers for operating the valves, the said levers being so arranged that they may be operated either independently or all at one time.

2. The combination with right and left tractor wheel brakes and separate trailer brakes and a main valve device for setting all of said brakes at one time, of a valve unit comprising three separate valves, control means for operating each of said valves to apply the tractor wheel brakes and the trailer brakes, and the said control means being arranged for independent or simultaneous operation to apply the tractor and trailer brakes independently or simultaneously.

3. The combination with right and left tractor wheel brakes and separate trailer brakes and a main valve device for setting all of said brakes at one time, of a valve unit comprising three separate valves, means for actuating the valves for applying the tractor wheel brakes and trailer brakes independently of each other, the said valve unit being connected to said main valve device, and connections including check valve means in said valve unit for selectively connecting the brakes to the main valve device or the valves in said unit.

4. The combination with right and left wheel tractor brakes and a trailer brake, of a main valve, means for supplying fluid under pressure through said main valve for operating all of the brakes simultaneously, a valve unit comprising three separate valves, means for supplying fluid under pressure through the said separate valves for operating the brakes selectively, the said main valve being connected to the valve unit, and check valve means forming a part of the valve unit and operated by the fluid supplied through said separate valves for connecting the brakes to the main valve or to said separate valves.

5. In a tractor and trailer brake system wherein right and left tractor wheel brakes and separate trailer brakes are provided and a single main valve is arranged for supplying fluid under pressure to all brakes simultaneously, a control valve unit connected to said main valve, three separate valves in the unit for supplying fluid under pressure to any brake selectively, and means in the said unit for automatically connecting the brakes to either the main valve or said separate valves as they are operated to apply the brakes.

6. In a tractor and trailer brake system wherein right and left tractor wheel brakes and separate trailer brakes are provided and a single main valve is arranged for supplying fluid under pressure to all brakes simultaneously, a control valve unit connected to the main valve to receive fluid therefrom and also connected to receive fluid independently of the main valve, three separate valves of graduating type operatively arranged to supply fluid to the brakes selectively and independently of the main valve, and means operated by fluid pressure from both the main valve and said graduating valves for connecting the brakes to the valves as they are operated to supply the fluid to the brakes.

7. A valve unit of the character described comprising, a main valve body having three valve chambers, separate brake control valves arranged in said chambers, a manifold member on the body, means for supplying fluid under pressure through the said manifold member to the valves, the said body having outlet ports in one side opening from the valve chambers, a check valve body mounted on said main valve body and having three cylinders communicating at one end respectively with the said ports to receive fluid therefrom under control of the said valves, means for supplying fluid under pressure simultaneously to the other ends of the cylinders, the said cylinders having outlet means intermediate their ends, and reciprocating valve members mounted in the said cylinders to connect either end of the cylinders to said outlet means in response to the flow of fluid inwardly through said ends.

8. A valve unit of the character described comprising, a main valve body having three valve chambers, separate brake control valves arranged in said chambers, a manifold member on the body, means for supplying fluid under pressure through the said manifold member to the valves, the said body having outlet ports in one side opening from the valve chambers, a check valve body mounted on said main valve body and having three cylinders communicating at one end respectively with the said ports to receive fluid therefrom under control of the said valves, a manifold mounted over the three ends of the cylinders for supplying fluid thereto, outlet means for each cylinder intermediate the ends thereof, and a check member movably mounted in each cylinder for permitting communication between said outlet means and either the said valves or the manifold.

9. A valve unit of the character described, comprising, a main valve body, a plurality of control valves in the body, a check valve body mounted on said main valve body and having a plurality of check valves, connecting means between the said control valves and the check valves, a manifold connected to the control valves, and another manifold connected to the check valves, the said manifolds being adapted to supply a fluid under pressure to said control and check valves, and means controlled by the check valves for receiving fluid directly from one manifold or from the other manifold under control of the said control valves.

10. A valve unit of the character described, comprising a main body member, a plurality of control valves therein, a check valve body mounted on said main body member and having a plurality of check valves connected to said control valves, a manifold mounted on the main body member for supplying a fluid under pressure to the control valves, a manifold mounted on the check valve body for supplying fluid under pressure to the check valves, outlet means for receiving the fluid from one manifold through the control and check valves and from the other manifold through the check valves alone, and exhaust means for receiving fluid from said outlet means in response to operation of the control valves.

11. In a tractor and trailer brake assembly wherein separate right and left tractor wheel brakes and separate trailer brakes are employed, a source of fluid under pressure for actuating the brakes, a valve unit having separate valves for supplying fluid from said source separately to the right and left tractor wheel brakes and to the trailer brakes, and the said unit having also another valve for supply fluid from said source to all of said brakes simultaneously.

12. In a tractor and trailer brake assembly wherein separate right and left tractor wheel brakes and separate trailer brakes are employed, a source of fluid under pressure for actuating the brakes, a valve unit having three valves therein for supplying fluid from said source to the tractor wheel and trailer brakes separately and selectively, another valve in said unit arranged to supply fluid from said source to all of the brakes simultaneously, and check valves arranged in connection with the first mentioned three valves for isolating them from the brakes when the last mentioned valve is operated to supply fluid to all brakes at one time.

13. In a valve of the character described, a valve housing, a series of graduating valves operatively arranged in the housing, the said housing having check valve cylinders communicating with the valves, check valve members interchangeably mounted in at least a part of the said cylinders, and separate outlet means for the cylinders.

14. A valve structure comprising a main body portion having a fluid inlet and outlet, a valve in said body portion for controlling the flow of fluid from said inlet to the outlet, exhaust means for exhausting fluid from the outlet under control of the valve, a check valve body having a cylinder communicating at one end with the outlet, means for supplying fluid to the other end of the cylinder, a fluid outlet means between the ends of the cylinder, and a check valve movable in the cylinder for connecting said outlet means with either end thereof.

15. In a valve, a body portion having a plurality of cylinders opening at opposite ends, means for supplying fluid selectively to one end of the cylinder and simultaneously to the other ends, separate outlet means at substantially a midpoint of each cylinder, and a check valve member movable in each cylinder for admitting fluid from one end to the outlet means while sealing the opposite end of the cylinder.

16. In a valve, a main valve body, a series of separately controllable valves therein, means on one end of the body for supplying fluid to all valves, the said body having outlets at one side for passing fluid from the valves, a check valve body arranged on the side of the main valve body and having check valve cylinders communicating at one end with said outlets, means for supplying fluid to the other ends of the cylinders, outlet means intermediate the ends of each cylinder, and check valves in the cylinders for controlling the flow of fluid from the ends of the cylinders through said outlet means.

17. In a valve, a main valve body, a plurality of valves therein, an inlet manifold member on an upper end of the body for supplying fluid to the valves, lever means extending laterally from the lower end of the body for operating the valves, the said body having outlet openings in one side over the lever means for receiving fluid from the valves, a check valve body mounted on the main valve body partially overlying the said lever means, the said check valve body having cylinders opening through opposite ends and communicating at one end with the said outlet openings, a manifold on the opposite end of the check valve body for supplying fluid to the cylinders, outlet means for each cylinder, and check valve members movable in the cylinders for controlling the flow of fluid from the ends thereof to the outlet means.

18. In a tractor and trailer brake assembly wherein separate tractor and trailer brakes are employed, a source of fluid under pressure for actuating the brakes, a valve unit having separate valves therein for supplying fluid from said source to the tractor and trailer brakes separately and selectively, another valve in the said unit arranged to supply fluid from said source to all of the brakes simultaneously, and check valves arranged in connection with the said separate valves for isolating them from the brakes when the last mentioned valve is operated to supply fluid to all brakes simultaneously.

19. In a valve of the character described, a valve housing, at least two main control valves arranged in said housing, means for supplying a fluid under pressure to said valves, a check valve unit having a plurality of cylinders communicating with said control valves to receive fluid therefrom, outlet means for each cylinder, means for supplying fluid from said source to all of said cylinders independently of the control valves, and check valve members slidably mounted in at least a part of said cylinders and operative to isolate the control valves from outlet means when fluid is supplied to all of the cylinders simultaneously.

WAYNE E. SCHOBER.